INVENTOR.
CARL E. POSTEL
BY
*A. H. Oldham*
ATTORNEY

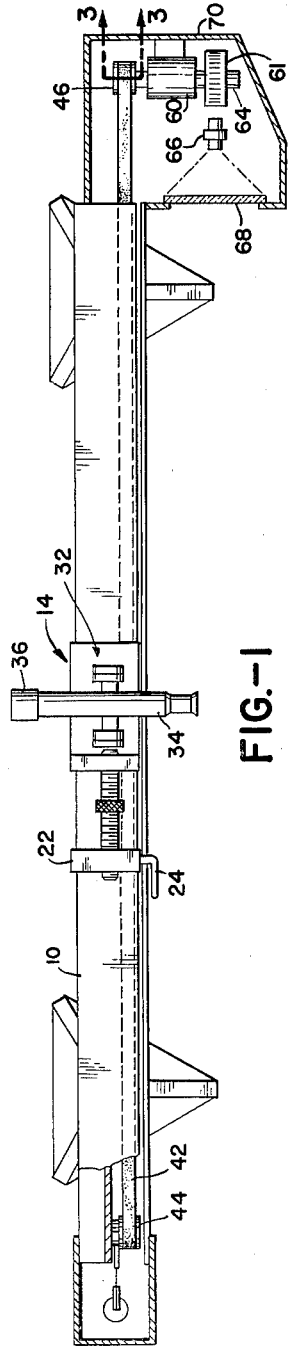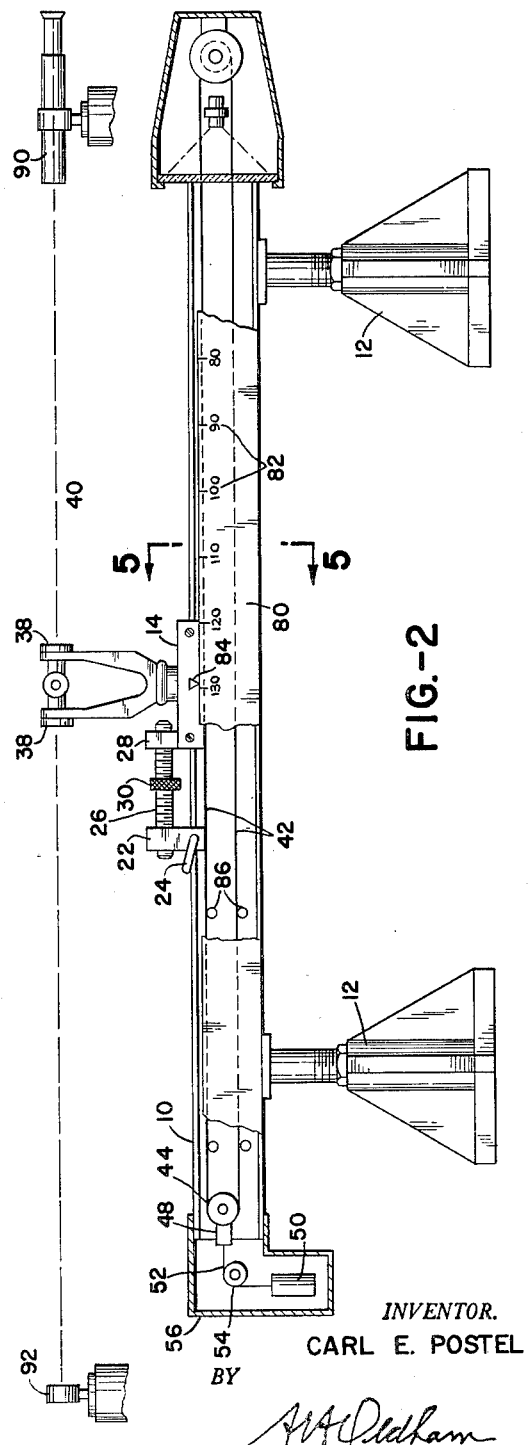
March 21, 1961 C. E. POSTEL 2,975,522
TOOLING BAR
Filed Nov. 3, 1959 2 Sheets-Sheet 1
FIG.-1
FIG.-2
INVENTOR.
CARL E. POSTEL
BY
ATTORNEY March 21, 1961  C. E. POSTEL  2,975,522
TOOLING BAR Filed Nov. 3, 1959  2 Sheets-Sheet 2

United States Patent Office 2,975,522
Patented Mar. 21, 1961

2,975,522

TOOLING BAR

Carl E. Postel, Canton, Ohio, assignor to Goodyear Aircraft Corporation, Akron, Ohio, a corporation of Delaware Filed Nov. 3, 1959, Ser. No. 850,590

5 Claims. (Cl. 33—125)

This invention relates to tooling bars for laying out or measuring relatively large machines, jigs, and the like, for example, those employed in the aircraft and related industries.

It is the general object of the invention to simplify and improve upon existing tooling bar constructions by the provision of a relatively simple and inexpensive, but durable, accurate and easily operated tooling bar.

Another object of the invention is to provide a tooling bar which does not contain accurately spaced holes as is common in most tooling bars, and in which a steel tape is used to transmit the motion of the transit supporting carriage to a graduated and calibrated drum which indicates the position of the carriage.

Another object of the invention is to provide a tooling bar in which expansion or contraction of the supporting bar does not affect the measurements with the bar and in which an interchangeable measuring drum is employed which is of the same material as the structure being measured so that true readings will always be obtained regardless of temperature variation.

The foregoing objects of the invention, and other objects which will become apparent as the description proceeds, are achieved by the provision of a tooling bar having a beam, a pair of supports for the beam, a carriage movably mounted on the beam, an endless tape positioned adjacent the beam, an idler roll mounted at one end of the beam about which the tape extends, a precision drum mounted at the other end of the beam about which the tape extends, means connecting the carriage to one reach of the tape, means associated with the drum and viewable from adjacent the carriage for indicating the rotary position of the drum, a quick clamp means normally movable with the carriage and adapted to releasably clamp on the beam, means for adjusting the distance between the clamp means and the carriage after the clamp means has been clamped to the beam, a transit supported on the carriage at right angles to the direction of movement of the carriage, means associated with the transit for changing the line of sight of the transit on the carriage in a direction toward or from the clamp means, and scale markings on the beam separated by a distance equal to a multiple of the circumference of the drum.

For a better understanding of the invention reference should be had to the accompanying drawings wherein Fig. 1 is a plan view of a tooling bar incorporating the principles of the invention;

Fig. 2 is a side elevation of the tooling bar of Fig. 1;

Figure 3:
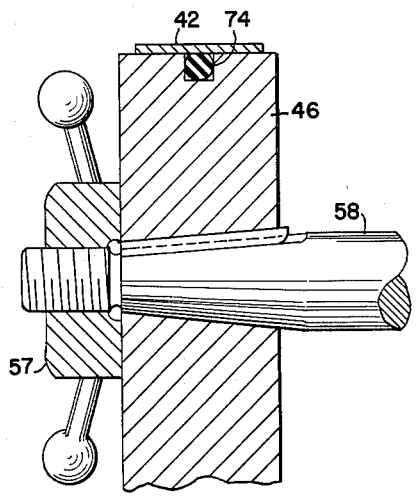
Fig. 3 is an enlarged fragmentary cross-sectional view, taken on line 3—3 of Fig. 1, and illustrating details of the measuring drum.

In the drawings, the numeral 10 indicates a beam, for example, of I-beam shape and adapted to be supported by a pair of support members 12 which are usually made vertically adjustable by means not shown and forming no part of the present invention.

Figure 5:
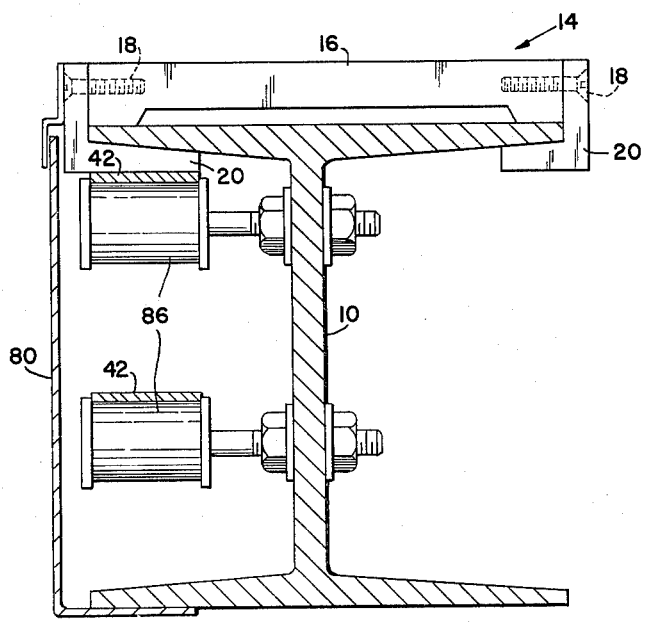
Fig. 5 is an enlarged fragmentary view, taken on line 5—5 of Fig. 2, and showing details of the construction of the beam, tape, and carriage.

Slidably supported on the top of the beam 10 is a carriage, indicated as a whole by the numeral 14, the upper surface of the beam 10 and the sides of the undersurface of the upper portion of the beam being suitably machined to slidably support the carriage. The carriage conveniently comprises a substantially rectangular plate 16 to which are secured, as by screws 18, L-shaped side plates 20 extending underneath the upper edges of the beam 10 in the manner best seen in Fig. 5 so as to allow sliding movement of the carriage 14 along the beam but without permitting lateral displacement or tilting of the carriage on the beam.

Associated with the carriage 14 is a quick clamp means 22 adapted to be quickly clamped to or released from the beam 10, for example by means of a lever 24. The clamp means 22 is secured by means of an adjustment screw 26 to an ear 28 formed integrally with the carriage 14. The screw 26 has right and left hand threads formed, respectively, at the opposite ends thereof and the centrally positioned adjusting wheel 30 at the center thereof so that with the clamp means 22 locked to the beam 10 a rotary movement of the wheel 30 in one direction or the other moves the carriage 14 towards or from the clamp means 22.

Mounted on the carriage 14 at right angles to the movement of the carriage 14 on the beam 10 is a transit indicated as a whole by the numeral 32. This transit, sometimes called a jig transit, is of known type including a supporting yoke allowing movement of the transit tube 34 in a vertical plane at right angles to the carriage 14 and beam 10. The transit tube 34 has an optical micrometer 36 associated therewith so that adjustment of the optical micrometer changes the line of sight of the transit on the carriage 14 in the direction of movement of the carriage on the beam 10. Stated more specifically, the optical micrometer 36 changes the line of sight through the transit tube 34 to and from the axis of the tube, but in a position parallel thereto, for a final micrometer reading in thousandths of an inch. The transit 32 furthermore, in accord with existing practice, is provided with mirrors 38 at exact right angles to the axis of the trunnion support for the transit tube 34 so that the transit 32 can be properly lined up with a line of sight, marked 40, and hereinafter more fully discussed.

Mounted at the side of the beam 10 is an endless steel tape 42 having one end extending around an idler roller 44 rotatably mounted at one end of the beam 10, and around a precision drum 46 rotatably mounted at the other end of the beam 10. The roller 44 has its journals slidably mounted at 48 for horizontal movement in the end of the beam, and with a weight 50 being connected by a cable 52 to the bearings of the roller 44, the cable 52 extending over fixed pulley 54. Thus, the weight 50 acts to apply constant tension upon the endless belt 42. A casing 56 is usually provided to surround the weight 50 and associated mechanism. One of the L-shaped sides 20 of the carriage 14 is secured to the upper reach of the tape 42 so that when the carriage 14 is moved back and forth on the beam 10 the motion of the carriage is transmitted through the tape 42 to the precision drum 46.

Looking now at the right hand ends of Figs. 1 and 2, and at Fig. 3, the precision drum 46 is secured by a quickly releasable nut 57 upon a shaft 58 journalled in precision ball bearings 60 carried on the end of the beam 10, and with the shaft 58 extending through the other side of the bearings 60 and supporting a drum 61 having optical tooling graduations thereon so that when a light source 64 is positioned inside of the drum it is adequately illuminated from the inside. Then by positioning a focusing lens with cross hairs at 66 and a frosted screen at 68 and encasing the assembly at 70 a reading of the position of the precision drum 46 can be seen on the screen 68 by an operator standing in front of the transit tube 34.

Figure 4:
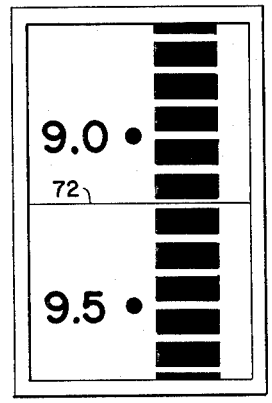
Fig. 4 is an enlarged fragmentary view of the optical means associated with the measuring drum.

The precision drum 46 is made with a circumference of exactly 10 inches, for example, and not less, or exactly 20 or exactly 30 inches, and the drum is made of the same material as the structure to be measured. When the structure to be measured is steel then the drum 46 is also of steel, or if the structure to be measured is aluminum, then the drum 46 is made of aluminum. The optical tooling graduations marked on the drum 62 are made so that the smallest division represents .1 inch. For example, in Fig. 4 a cross hair marked 72 and associated with the lens 66 is shown to be positioned at exactly 9.2 inches on the drum 62.

The precision drum 46 is shown in cross-sectional detail in Fig. 3 as including a rubber O-ring 74 positioned around the periphery of the drum in a suitable groove so as to additionally prevent slippage between the drum 46 and the tape 42 surrounding the drum.

Completing the assembly of the tooling bar is a front cover 80 which is provided with graduations along its length which are some multiple of the circumferential length of the precision drum 46, for example at 10 inch intervals as indicated by the numeral 82. It might be noted that the circumferential length of the drum 46 is not made less than the distance between the graduations 82. The carriage 14 has a marker 84 indicating the position of the carriage with respect to the graduations 82 on the cover 80. Rollers 86 are provided at spaced intervals along the beam 10 for supporting the beam 42.

In the use of the tooling bar as described, and in accord with the known general practices of using a tooling bar, the tooling bar is set up in a position substantially parallel to the structure to be measured and a selected number of feet therefrom, and the line of sight 40, heretofore referred to, is established by means of a telescope 90 and a target 92, forming no part of the present invention, and well known in the art. In setting up the tooling bar with the line of sight 40 the bar is made parallel to the line of sight by suitable adjustment of the supports 12 for the beam 10, and with the mirrors 38 on the sides of the transit 32 being made exactly square to the line of sight 40 so that cross hairs in the telescope 90 are properly reflected by the mirror 38. Sometimes the mirrors 38 are one-third silvered so that the target 92 may be seen in the telescope 90 as well as the reflections of the mirrors 38. Of course, the telescope 90 and target 92 are carried upon suitable supports usually extending down to the floor and properly adjustable so as to position the line of sight 40 in proper vertical height relation to the mirrors 38 of the transit 32.

The transit 32 is now aligned with the first point to be measured on the structure, this being achieved by releasing the clamp means 22 and moving the carriage into a position of substantial register with the point on the structure. Now the clamp 22 is locked to the beam by means of the handle 24 and the wheel 30 is turned to bring the transit still closer to the point to be measured, followed by final adjustment of the optical micrometer 36 on the transit tube 34 to bring the transit into complete register with the point. In a typical example, and with the carriage positioned as shown in the drawings, the first point measured on the structure shows a distance of 120 inches on the 10-inch graduations 82, the tape 42 has positioned the precision drum 46 and the optical drum 62 to the nearest inch and tenth of an inch, namely, 9.2, and the final optical micrometer adjustment has shown a reading of .075, so that the precise location of the point being measured is 120 plus 9.2 plus .075 or 129.275 inches.

In exactly the same way the second point to be measured is located. This is done by releasing the handle 24 on the clamp means 22, moving the carriage 14 by hand to a rough adjustment of the point, clamping the means 22 and adjusting the micrometer wheel 30 to bring the carriage 14 to the nearest inch and tenth of an inch, followed by the adjustment of the micrometer 36 to the nearest thousandth of an inch.

From the foregoing it will be recognized that the objects of the invention have been achieved by the provision of a tooling bar which does not contain accurately spaced holes in the bar itself. The steel tape used does not contain markings of any kind, and its only function is to transmit the motion of the carriage to the graduated drum. Temperature variations do not affect the tape inasmuch as it is always under tension, and even though the tape expands and contracts, it always transmits the exact motion initiated by the carriage. The material from which the tooling bar is made is not important inasmuch as it only serves as a track for the carriage, and readings are not affected by its expansion or contraction.

The only precision parts of the tooling bar, namely, the measuring drum, the spindle and graduated drum are circular in shape and relatively small in size which keeps the cost of the tooling bar low. The measuring or precision drum 46 is made interchangeable so that the drum is always of the same material as the structure being measured. In this manner true readings are always obtained regardless of the room temperature or the material in the structure being measured.

While a certain representative embodiment and details have been shown for the purpose of illustrating the invention, it will be apparent to those skilled in this art that various changes and modifications may be made therein without departing from the spirit or scope of the invention.

1. The combination in a tooling bar of a beam, a pair of supports for the beam, a carriage movably mounted on the beam, an endless tape positioned adjacent the beam, an idler roll mounted at one end of the beam about which the tape extends, a precision drum mounted at the other end of the beam about which the tape extends, means tensioning the idler roll away from the drum to tension the tape, means connecting the carriage to one reach of the tape, optical means associated with the drum and viewable from adjacent the carriage for indicating the rotary position of the drum, a quick clamp means normally movable with the carriage and adapted to releasably clamp on the beam, means for adjusting the distance between the clamp means and the carriage after the clamp means has been clamped to the beam, a transit supported on the carriage at right angles to the direction of movement of the carriage, micrometer optical means associated with the transit for changing the effective position of the transit on the carriage in a direction toward or from the clamp means, and scale markings on the beam separated by a distance equal to the circumference of the drum.

2. The combination in a tooling bar of a beam, a pair of supports for the beam, a carriage movably mounted on the beam, an endless tape positioned adjacent the beam, an idler roll mounted at one end of the beam about which the tape extends, a precision drum mounted at the other end of the beam about which the tape extends, means tensioning the idler roll away from the drum to tension the tape, means connecting the carriage to one reach of the tape, optical means associated with the drum and viewable from adjacent the carriage for indicating the rotary position of the drum, a quick clamp means normally movable with the carriage and adapted to releasably clamp on the beam, means for adjusting the distance between the clamp means and the carriage after the clamp means has been clamped to the beam, a transit supported on the carriage at right angles to the direction of movement of the carriage, and scale markings on the beam separated by a distance equal to the circumference of the drum.

3. The combination in a tooling bar of a beam, a pair of supports for the beam, a carriage movably mounted on the beam, an endless tape positioned adjacent the beam, an idler roll mounted at one end of the beam about which the tape extends, a precision drum mounted at the other end of the beam about which the tape extends, means tensioning the idler roll away from the drum to tension the tape, means connecting the carriage to one reach of the tape, optical means associated with the drum and viewable from adjacent the carriage for indicating the rotary position of the drum, a quick clamp means normally movable with the carriage and adapted to releasably clamp on the beam, a transit supported on the carriage at right angles to the direction of movement of the carriage, micrometer optical means associated with the transit for changing the effective position of the transit in a direction toward or from the clamp means, and scale markings on the beam separated by a distance equal to a multiple of the circumference of the drum.

4. The combination in a tooling bar of a beam, a carriage movably mounted on the beam, an endless tape positioned adjacent the beam, an idler roll mounted at one end of the beam about which the tape extends, a precision drum mounted at the other end of the beam about which the tape extends, means for tensioning the tape over the roll and drum, means connecting the carriage to one reach of the tape, means associated with the drum and viewable from adjacent the carriage for indicating the rotary position of the drum, a quick clamp means normally movable with the carriage and adapted to releasably clamp on the beam, means for adjusting the distance between the clamp means and the carriage after the clamp means has been clamped to the beam, a transit supported on the carriage at an angle to the direction of movement of the carriage, means associated with the transit for changing the effective position of the transit in a direction toward or from the clamp means, and scale markings on the beam separated by a distance equal to a multiple of the circumference of the drum.

5. The combination in a tooling bar of a beam, a carriage movably mounted on the beam, an endless tape positioned adjacent the beam, an idler roll mounted at one end of the beam about which the tape extends, said drum being constructed of the same material as the object to be measured with the tooling bar, a precision drum mounted at the other end of the beam about which the tape extends, means for tensioning the tape over the roll and drum, means connecting the carriage to one reach of the tape, means associated with the drum and viewable from adjacent the carriage for indicating the rotary position of the drum, a quick clamp means normally movable with the carriage and adapted to releasably clamp on the beam, means for adjusting the distance between the clamp means and the carriage after the clamp means has been clamped to the beam, a transit supported on the carriage at an angle to the direction of movement of the carriage, means associated with the transit for changing the effective position of the transit in a direction toward or from the clamp means, and scale markings on the beam separated by a distance equal to a multiple of the circumference of the drum.

References Cited in the file of this patent

UNITED STATES PATENTS

| | | |
|---|---|---|
| 819,243 | Mothes | May 1, 1906 |
| 1,715,074 | Platten | May 28, 1929 |
| 1,804,421 | Klopsteg | May 12, 1931 |
| 2,583,371 | Guttmann | Jan. 22, 1952 |

FOREIGN PATENTS

| | | |
|---|---|---|
| 148,306 | Great Britain | June 16, 1921 |
| 564,311 | France | Oct. 17, 1923 |
| 47,030 | France | Aug. 31, 1936 |
| | (Addition to No. 756,499) | |
| 416,204 | Italy | Nov. 20, 1946 |